July 18, 1933.  H. H. CUTLER  1,919,181
VEHICLE PROPULSION AND CONTROL SYSTEM
Filed July 18, 1932
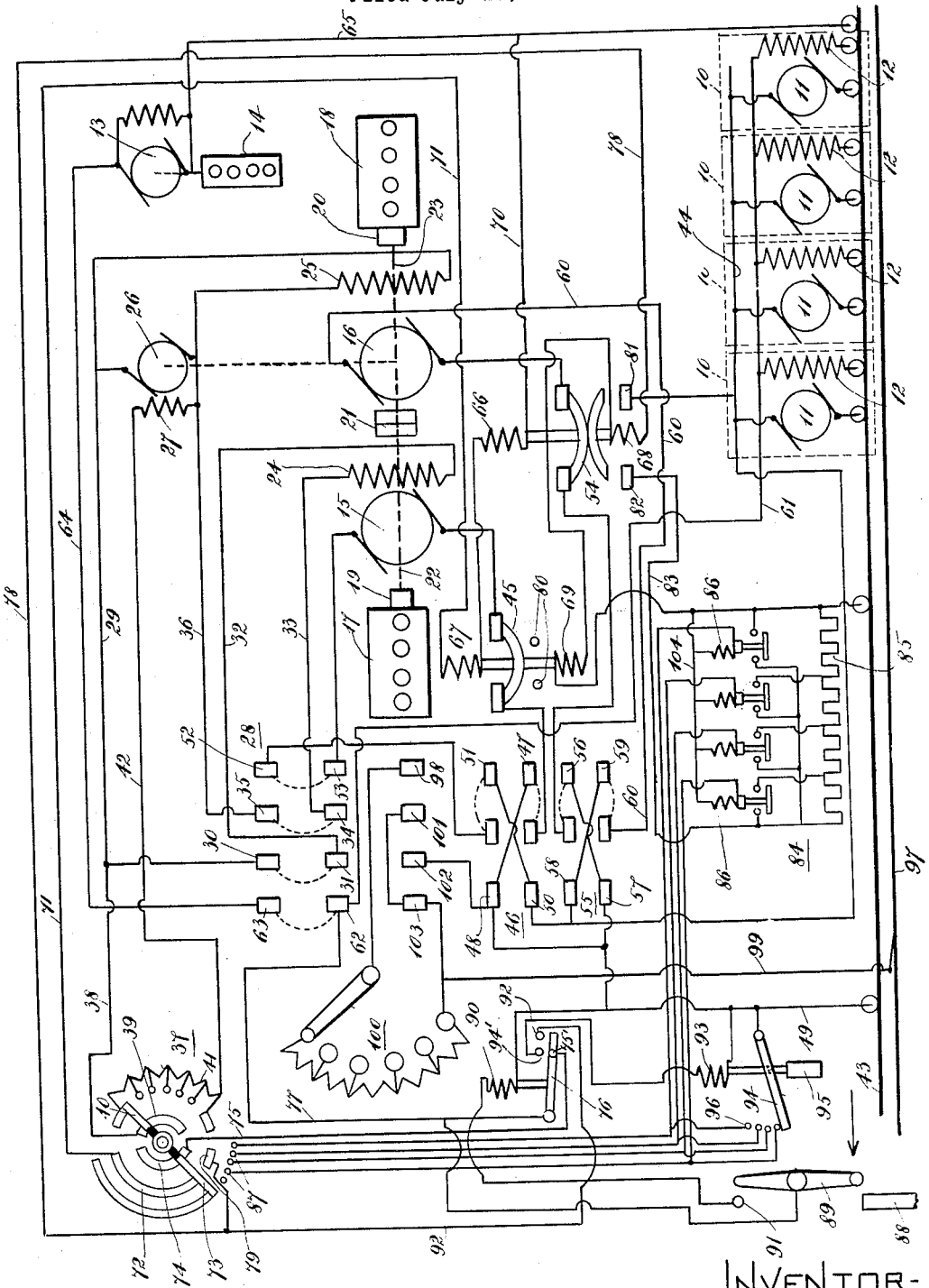
INVENTOR=
Henry H. Cutler
BY  Geo. K. Woodworth
ATTORNEY=

Patented July 18, 1933

1,919,181

UNITED STATES PATENT OFFICE

HENRY H. CUTLER, OF CORAL GABLES, FLORIDA; J. RALPH TATUM EXECUTOR OF SAID HENRY H. CUTLER, DECEASED

VEHICLE PROPULSION AND CONTROL SYSTEM

Application filed July 18, 1932. Serial No. 623,107.

This invention which is an improvement on the electric train control for gas engine propulsion described and claimed in my United States Letters Patent No. 1,833,017, granted November 4, 1931 relates to a vehicle propulsion and control system that is adapted especially for the control of a train employing one or more prime movers such as an internal combustion engine or the like for driving one or more electric generators under normal conditions.

Heretofore it has been the practice to shut down the engine or engines when trains equipped with such systems enter electrically equipped subways and employ an electric locomotive to pull the train through such subways. It is therefore the object of the present invention to provide a system of vehicle propulsion and control which will eliminate the necessity of using an electric locomotive to haul the train through a subway by so arranging matters that one of the electric generators may be switched to the third rail or trolley when entering a subway or passing through a large city where the engine exhaust might be objectionable, shutting down the gas engine or engines or other prime mover and energizing the propelling motors by the second generator which will be mechanically coupled to the generator first mentioned, the latter (now energized by the third rail or trolley) acting as a motor and driving the second generator.

The present invention is disclosed in connection with a system which involves many of the features of my patent above set forth, such as speed control of the engine or engines, remote control of the same, voltage control of the generators and dynamic braking, and the feature of remote control of the engine speed set forth in my United States Letters Patent 1,833,045, issued Nov. 24, 1931 may with advantage be incorporated therein; but it is to be understood that my invention is of more general application and is not limited to the features aforesaid.

If an internal combustion engine is employed as a prime mover I prefer to employ an engine of the type described and claimed in the patent to R. W. Harroun, 1,824,992, dated September 29, 1931, but it will be understood that I do not limit myself thereto and that any suitable type of prime mover may be used.

In the drawing which accompanies and forms a part of this specification the figure is a diagram showing an arrangement of circuits and apparatus involving my improved system of vehicle propulsion and control.

In the particular drawing selected for more fully disclosing the principle of my invention there is represented at 10, 10 a number of units making up an electrically-propelled train, each unit being provided with one or more propelling motors 11, 11 having separately excited fields 12, 12 which are energized by the shunt-wound generator 13 driven by the prime mover 14, herein shown as an internal combustion engine which may be of the self-starting type and preferably is provided with a suitable speed control such for exmaple as shown in my Letters Patent above mentioned.

The electric generators 15, 16 are connected in parallel with the armatures of the propelling motors for normal operation, that is to say, when said generators are actuated by train-carried prime movers, the drawing representing the relative positions of the several parts for normal operation. The prime movers are herein shown as internal combustion engines 17, 18 and while engines of any suitable type may be employed I prefer to use high-speed balanced engines of the type described in the patent to R. W. Harroun aforesaid. Each engine is coupled to its generator preferably by an overrunning clutch 19, 20, respectively, of any suitable type whereby each engine will drive its generator in a given direction and when such engine is not in operation each generator may be driven in said direction free of the engine crank shaft. For example, the generator 15 can be energized by a source of power and operate as a motor without rotating the engine shaft. Clutches of this character are well known and need no further description herein. Preferably suitable gear reduction is interposed between each overrunning clutch and the engine with which it is associated. Means are provided for mechanically coupling the generators together, such for example as the rigid jaw clutch 21, that is to say, a positive clutch that cannot slip and the two elements of which cannot be engaged while the shafts 22, 23 are running at different speeds without crashing, but can be disengeged at any time. Clutches of this type are also well known and accordingly the present showing is conventional.

The fields 24, 25 of the separately excited generators 15, 16 are energized by the exciter generator 26 having a shunt winding 27. The armature of the exciter generator is permanently connected to the field coil 25 and is connected through the four-pole change-over switch 28 to the field coil 24, the circuit being as follows, viz, from one pole of the generator 26 by wire 29 to block 30 of said switch and from block 31 thereof by wire 32 to said field coil, thence by wire 33 to switch block 34 and from switch block 35 and wire 36 back to the other pole of the exciter generator.

The strength of the field 27 and consequently the field strength of the generators 15, 16 and the voltage delivered by said generators to the armatures of the propelling motors and therefore the speed of the train, is governed by the controller 37, said field 27 and the armature of the exciter generator 26 being serially connected with said controller by way of the wires 29, 38, segment 39 of said controller, arm 40, resistance 41, and wire 42. The exciter generator 26 preferably is belt-driven from the shaft 23 of the generator 16. With the exception of the circuit from said exciter-generator to the field coil 25 and the circuit connecting the field coil 27 of the exciter generator to the controller, all the circuits of the system terminate at the ground rail 43.

The generators 15, 16 are connected in parallel with the armatures of the propelling motors, each of which is connected between the ground rail and the motor-armature train-line 44 which runs through the train. The circuits are as follows, the switches being in the positions shown: From one pole of the generator 15 to the solenoid controlled switch 45 (hereinafter more fully described), thence to the middle block of the reversing switch 46, to blocks 47, 48, thereof, thence to the track connection 49, through the armatures of the propelling motors to the motor armature train line 44, thence back to the other pole of the generator by way of blocks 50, 51 of the reversing switch, the middle block thereof and blocks 52, 53 of the change-over switch and thence back to the other pole of said generator; and from one pole of the generator 16 to the solenoid-actuated switch 54, middle block of the reversing switch 55, blocks 56, 57 thereof, track-rail connection 49, armatures of the propelling motors, thence back to the other pole of said generator by the train line 44, blocks 58, 59 of the last-mentioned reversing switch, middle block thereof, and wire 60.

When the reversing switches are thrown over to the position opposite to that indicated by dotted lines, the direction of the current from the generators 15, 16 through the armatures of the propelling motors is reversed, such current passing therethrough from the motor-armature train-line to the ground rail through circuits that will be obvious by inspection of the diagram.

The field windings 12 of the propelling motors are connected between the ground rail and the motor-field train-line 61 which passes through the train and is connected through the blocks 62, 63 of the change-over switch and the wire 64 to one pole of the exciter generator 13, the other pole of which is connected by the wire 65 to said rail.

To stop the train the bridging arm 40 is moved back (counterclockwise) first to reduce the voltage delivered to the motor armature train-line and finally to break the circuit of the solenoids 66, 67 and immediately thereafter energize the solenoids 68, 69 through the following circuits, to wit, first, from one pole of the generator 13 by wires 65, 70, said solenoids 66, 67, wire 71, segment 72 of the controller, bridging arm 73 and segment 74 thereof, wire 75, the arm of the normally-open switch 76, wire 77, blocks 62, 63 of the change-over switch and thence back to the other pole of said generator 13 by the wire 64, whereby said solenoids 66, 67 are energized when the train is running under normal conditions; second, from said pole of said generator 13 by way of wire 65 and ground rail through the solenoids 69 and 68 and thence by wire 78 to the segment 79 of the controller, arm 73 and segment 74 thereof, wire 75, switch arm 76, thence back to the other pole of said generator via wire 77, blocks 62, 63 of the change-over switch and wire 64, whereby said solenoids 68, 69 are energized when the arm 73 makes contact with the segment 79 immediately after breaking contact with the segment 72.

Upon the energization of the solenoid 69 and the opening of the circuit of the solenoid 67, the switch 45 opens the circuit of the generator 15 and is held on the back stops 80. Upon the energization of the solenoid 68 and the de-energization of the solenoid 66, the switch 54 opens the circuit of the generator 16 and by bridging the terminal members 81, 82 connects the armature train line 44 by wire 83 with the dynamic brake 84 comprising the rheostat 85 and a plurality of solenoids 86 whereby the current produced by the propelling motors which are now driven as generators by the momentum of the train is absorbed, as explained in detail in my Patent 1,833,017. By further counterclockwise movement of the controller arm over the terminals 87, the resistance of said rheostat gradually is reduced and the speed of the train eventually brought to a stop by the dynamic brake.

In the event of the engineer running past a block signal, means may be provided for the automatic actuation of the dynamic brake. In the present instance such means are represented conventionally by the semaphore arm 88 which when in horizontal or stop position, which it assumes when a train enters a block and in which position it remains until the train leaves said block or reaches the next semaphore, is in the path of the arm 89. Should the engineer run past the semaphore, the direction of the train travel being indicated by the arrow, said switch closes the circuit of the solenoid 90 at the terminal 91 thereby connecting said solenoid across the generator 13. The energization of said solenoid causes the arm 76 to open the circuit of the solenoids 66, 67 and close that of the solenoids 68, 69 in a manner that will be obvious, for said switch arm is connected to the wire 77 which is common to the circuit of both sets of solenoids 66, 67 and 68, 69, while the wire 75 connected to the switch point 75' which said arm normally contacts and the wire 92 connected to the switch point 92 form parts of the circuits of the solenoids 66, 67 and 68, 69, respectively. In this way the generators 15, 16 are disconnected from the armature train line and the latter is then connected to the dynamic brake. The energization of the solenoid 90 effects the connection of the solenoid 93 via the switch point 94', switch arm 76, wire 77, change-over switch 28 and wire 64 with the generator 13 whereupon the arm 94 is lifted gradually against the retarding effect of the dashpot 95 and is brought over the terminals 96, connected respectively with the terminals 87, thereby to close successively the circuits of the solenoids 86 and gradually reduce the resistance of the dynamic brake whereby the train is brought to a gradual stop.

When the train approaches a subway equipped with third rail or trolley (the term "third rail" being used herein as including a trolley or the like), the prime movers are shut down and if such prime movers are internal combustion engines such as conventionally represented at 14, 17 and 18, they are put out of operation preferably by opening their ignition circuits simultaneously as by a three-plate ignition switch or otherwise. The generators 15, 16 are then coupled together by the positive clutch 21 and the change-over switch 28 is thrown down, thereby connecting the armature and field of the generator 15 to the third rail 97 whereupon said generator operates as a motor and drives the generator 16, the armature of which remains in connection with the motor-armature train-line 44 and the track rail 43. The change-over switch in its new position also connects the motor-field train-line and the solenoids 66, 67 between said third rail and ground rail, while the circuit of the solenoids 68, 69 normally open between the arm 73 and segment 79 of the controller is also connected between said third rail and ground rail so that when the arm 73 is moved over to said segment 79, the solenoids 68, 69 will be energized by the third rail and actuate the switches 45, 54 for stopping the train in the manner above set forth.

When said change-over switch is thrown down the block 53 thereof is connected to the block 98 which in turn is connected to the third rail connection 99 through the starting rheostat 100 which may be of the standard automatic release type so that one pole of the generator 15 is connected to the third rail. The other pole of said generator remains connected, as hereinbefore set forth, to the ground track connection 49 through the reversing switch 46. It will be noted at this point that it is essential that said reversing switch remain in its forward position, as indicated by dotted lines, while said generator 15 is running as a motor, the direction of travel of the train being governed entirely by the reversing switch 55 under such condition. The generator 16 which is now driven through the interposition of the positive clutch 21 by the motor 15 remains connected, as hereinbefore set forth, with the motor-armature train-line and the field thereof is energized, as before, by the exciter 26. The field 24 of the motor 15, however, having been disconnected from said exciter by the change-over switch is energized from the third rail as follows: The block 34 to which one terminal of said field is connected by the wire 33 is connected to the block 101 and thence to the third rail connection 99, while the block 31 to which the other terminal of said field is connected by the wire 32 is connected to the block 102 which in turn is connected to the track connection 49.

The motor-field train-line 61 is connected to the block 62 of the change-over switch 28 and when said switch is thrown down, said block is connected to the block 103 which goes to the third rail connection 99, the circuit through the propelling motor fields being completed through the ground rail.

The energizing circuit of the solenoids 66, 67 may be traced as follows: From the third rail connection 99 to the block 103, block 62, wire 77, switch 76, point 75', wire 75, segment 74, arm 73, segment 72, wire 71, solenoids 67, 66, wire 70 and thence to the ground rail. It will be noted that when said arm 73 leaves the segment 72 the solenoids 66, 67 are de-energized. The circuit of the solenoids 68, 69 is as follows: From the third rail to block 103, block 62, wire 77, switch 76, contact 75', wire 75, segment 74, arm 73, segment 79, wire 78, solenoids 68, 69 and thence to the ground rail. It will be noted that when the arm 73 is moved over to the segment 79, the solenoids 68, 69 are energized immediately after the de-energization of the solenoids 66, 67 resulting from moving the arm 73 off the segment 62 and that the train of operations following the energization of said solenoids 68, 69 is the same as above set forth in the description of the system with the change-over switch in its normal position indicated by the dotted lines bridging the several pairs of blocks.

When the change-over switch is down, the solenoids 86 of the dynamic brake are energized as the arm 73 passes over the terminals 87 from the third rail by way of the switch blocks 103, 62, wire 77, switch 76, wire 75, said arm 73 and the several conductors which connect one terminal of said solenoids, respectively, to said terminals 87, the other terminals of said solenoids having a common connection 104 to the ground rail.

While I have described one specific illustrative embodiment of my invention, it will be understood that various modifications may be made both in the apparatus and circuit arrangements without departing from the invention as defined by the appended claims.

I claim:

1. A vehicle propulsion and control system comprising in combination, a prime mover, an electric generator driven thereby, a propelling motor energized by said generator, third-rail and track connections, means for electrically connecting said generator to said third-rail and track connections, a second generator connected to energize said propelling motor, and means for mechanically coupling said generators together when the first-mentioned generator is connected to said third-rail and track connections and is operating as a motor.

2. A vehicle propulsion and control system comprising in combination, a prime mover, an electric generator driven thereby, a propelling motor, a circuit connecting said generator to said propelling motor, third-rail and track connections, a switch for controlling said circuit, said switch being constructed and arranged to close said circuit and thereby connect said generator to said propelling motor when said generator is driven by said prime mover and to open said circuit and connect said generator to said third-rail and track connections when said prime mover is not in operation, a second generator connected to energize said propelling motor, and means for mechanically coupling said generators together when the first-mentioned generator is connected to said third-rail and track connections and is operating as a motor.

3. A vehicle propulsion and control system comprising in combination, a prime mover, an electric generator, means coupling said generator to said prime mover, a propelling motor, a circuit connecting said generator to said propelling motor, third-rail and track connections, a switch for controlling said circuit, said switch being constructed and arranged to disconnect said generator from said propelling motor and to connect the same to said third-rail and track connections, a second generator, a circuit connecting said second generator to said propelling motor, and means for mechanically coupling said generators together when the first-mentioned generator is connected to said third-rail and track connections and is operated as a motor.

4. A vehicle propulsion and control system comprising in combination, a prime mover, an electric generator, means coupling said generator to said prime mover, a propelling motor, a circuit connecting said generator to said propelling motor, third-rail and track connections, a switch for controlling said circuit, said switch being constructed and arranged to connect said generator to said propelling motor when said generator is actuated by said prime mover and to connect the same to said third rail and track connections when said prime mover is out of operation, a second generator, a circuit connecting said second generator to said propelling motor, and means for mechanically coupling said generators together when the first-mentioned generator is connected to said third-rail and track connections and is operating as a motor.

5. A vehicle propulsion and control system comprising in combination, two prime movers, two electric generators, means coupling said generators to said prime movers, respectively, a propelling motor, circuits connecting said generators in parallel to said propelling motor, third-rail and track connections, a switch for controlling one of said circuits, said switch being constructed and arranged to disconnect one of said generators from said propelling motor and connect the same to said third-rail and track connections, and means for mechanically coupling said generators together when one of them is electrically connected to said third rail and track connections and is operating as a motor.

6. A vehicle propulsion and control system comprising in combination, a prime mover, an electric generator, an over-running clutch coupling said generator to said prime mover, a propelling motor, a circuit connecting said generator to said propelling motor, third-rail and track connections, a switch for controlling said circuit, said switch being constructed and arranged to disconnect said generator from said propelling motor and connect the same to said third-rail and track connections, a second generator, a circuit connecting said second generator to said propelling motor, and a rigid-jaw clutch for coupling said generators together when the first-mentioned generator is connected to said third-rail and track connections and is operating as a motor.

7. A vehicle propulsion and control system comprising in combination, two separately-excited generators, means for energizing the fields thereof, a separately-excited propelling motor, a motor-armature train-line connecting the armatures of said generators with the armature of said propelling motor, a motor-field train-line, field-energizing means in said motor-field train-line, third-rail and track connections, means for switching said motor-armature train-line and said motor-field train-line to said third-rail and track connections, a prime mover, means for coupling one of said generators to said prime mover, and means for mechanically coupling said generators together when said motor-armature and motor-field train-lines are switched to said third rail and track connections.

8. A vehicle propulsion and control system comprising in combination, two separately-excited electric generators, an exciter-generator electrically connected to the fields of said generators, a separately-excited propelling motor, an exciter-generator electrically connected to the field of said propelling motor, a prime mover, means coupling one of said separately-excited generators to said prime mover, circuits connecting the armatures of said separately-excited generators to the armature of said propelling motor, third-rail and track connections, a switch controlling the armature and field circuits of one of said separately-excited generators, said switch being constructed and arranged to disconnect said armature circuit from said propeller motor and said field circuit from the first-mentioned exciter-generator and to connect said armature and field circuits to said third rail and track connections and simultaneously connect the field of said propelling motor to said third-rail and track connections, and means for mechanically coupling said generators together when the armature circuit of the last-named separately-excited generator is connected to said third-rail and track connections.

9. A vehicle propulsion and control system comprising in combination, a prime mover, an electric generator driven thereby, a propelling motor energized by said generator, third-rail and track connections, means for electrically connecting said generator to said third-rail and track connections, a second generator connected to energize said propelling motor, means for mechanically coupling said generators together when the first-mentioned generator is connected to said third-rail and track connections and is operating as a motor, and a switch and means associated therewith for disconnecting either generator from said propelling motor, said switch being connected to said vehicle and arranged for actuation by impact against a block-signal element.

10. A vehicle propulsion and control system comprising in combination, a prime mover, a generator driven thereby, a propelling motor supplied with current from said generator, manually operable means for controlling the field current of said generator, a rheostat having one or more resistance sections, connections at one end of the range of movement of said manually-operable means for disconnecting said propelling motor from said generator and connecting the same on short circuit through one or more of said resistance sections, and a switch and apparatus associated therewith automatically disconnecting said propelling motor from said generator and connecting the same on short circuit through one or more of said resistance sections, said switch being connected to said vehicle and arranged for actuation by impact against a block-signal element.

HENRY H. CUTLER.